(12) United States Patent
Cazzaro

(10) Patent No.: US 7,681,514 B2
(45) Date of Patent: Mar. 23, 2010

(54) FIXING GROUP FOR FACILITATED ATTACHMENT OF A WATERCRAFT APPLIANCE ONTO A BOAT AND METHOD FOR ATTACHING THE SAME

(75) Inventor: Michele Cazzaro, Besozzo (IT)

(73) Assignee: Harken Italy S.p.A., Lurago Marinone Como (IT)

( * ) Notice: Subject to any disclaimer, the term of this patent is extended or adjusted under 35 U.S.C. 154(b) by 0 days.

(21) Appl. No.: 12/033,345

(22) Filed: Feb. 19, 2008

(65) Prior Publication Data

US 2008/0196654 A1 Aug. 21, 2008

(30) Foreign Application Priority Data

Feb. 19, 2007 (EP) .................................. 07425089

(51) Int. Cl.
*B63B 21/04* (2006.01)
(52) U.S. Cl. ..................................... 114/218; 114/364
(58) Field of Classification Search ................. 114/343, 114/364, 218, 230.26; 254/266, 321, 416; 411/81, 134

See application file for complete search history.

(56) References Cited

U.S. PATENT DOCUMENTS

| 733,795 | A | * | 7/1903 | Barr | 254/416 |
| 739,294 | A | * | 9/1903 | Corbett | 254/416 |
| 1,952,484 | A | * | 3/1934 | Allee | 114/364 |
| 2,677,863 | A | * | 5/1954 | St John | 114/218 |
| 2,991,046 | A | * | 7/1961 | Parsons | 254/266 |
| 3,073,276 | A | * | 1/1963 | Taylor | 114/230.26 |
| 3,120,043 | A | * | 2/1964 | Henley | 114/218 |
| 3,270,705 | A | * | 9/1966 | Roeggen | 114/218 |
| 4,437,427 | A | * | 3/1984 | Mampaeij | 114/218 |
| 4,641,597 | A | * | 2/1987 | Paxton | 114/343 |
| 4,753,560 | A | * | 6/1988 | Ryder | 411/82 |
| 5,941,191 | A | * | 8/1999 | Dysarz | 114/218 |
| 6,321,677 | B1 | | 11/2001 | Butler | |
| 7,207,288 | B2 | * | 4/2007 | Henly | 114/343 |

FOREIGN PATENT DOCUMENTS

| DE | 20207685 | 8/2002 |
| GB | 2153320 | 8/1985 |

* cited by examiner

*Primary Examiner*—Lars A Olson
(74) *Attorney, Agent, or Firm*—Alan R. Stewart; Godfrey & Kahn, S.C.

(57) ABSTRACT

A fixing group of a watercraft appliance for the attachment thereof to an outer side of a deck wall of a boat comprises a base of the watercraft appliance and at least one seat formed in the base and suitable for receiving a respective threaded fastening element, so that said element has a free end projecting from the base for insertion into a respective through hole formed in the deck wall, so as to be accessible from the inner side of such a deck wall for fixing the watercraft appliance to it. The at least one seat comprises an access at a peripheral surface of the base and a retaining portion suitable for cooperating through shape coupling with said threaded fastening element to prevent the rotation and axial sliding thereof with respect to the base.

The invention also refers to a method for attaching a watercraft appliance comprising said fixing group to a deck wall of a boat by means of threaded fastening elements.

15 Claims, 4 Drawing Sheets

FIXING GROUP FOR FACILITATED ATTACHMENT OF A WATERCRAFT APPLIANCE ONTO A BOAT AND METHOD FOR ATTACHING THE SAME

CROSS REFERENCE TO RELATED APPLICATION

The present application claims priority to European Patent Application Serial No. EP07425089, filed on Feb. 19, 2007, the disclosure of which is incorporated herein by reference.

DESCRIPTION

The present invention relates to a fixing group for facilitated attachment of a watercraft appliance to a wall of a boat, particularly a deck wall.

The invention further relates to a method for attaching a watercraft appliance to a wall of a boat by means of such a fixing group.

Within the framework of the present invention and of the subsequent claims, the term: watercraft appliance is used to generally indicate any appliance intended to carry out a function on board of a boat and that, in order to be able to carry out such a function, must be fixed to a wall, particularly a deck wall, of the boat. Watercraft appliances of this kind are, for example, winches, windlasses, rope clutches, tracks, pad eyes.

For attaching watercraft appliances to the deck of a boat it is known to use conventional threaded fastening elements, such as screws or bolts, which are introduced into suitable holes provided in the frame of the appliance and in corresponding holes formed in a wall of the deck, and subsequently fixed on the opposite side by means of conventional fastening counter-elements, such as washers or nuts. Attachment requires the intervention of two operators, one on the appliance side (for example on the deck), hereafter referred to as "outer side" of the deck wall, to hold the heads of the screws or bolts, the other on the opposite side (for example, under the deck), hereafter referred to as "inner side" of the deck wall, to apply and tighten the corresponding washers or nuts.

Patent application EP 1 473 472 A1 discloses an assembly for assisting in the attachment of a watercraft appliance, particularly a winch, to a wall of a boat, particularly the deck. Such an assembly comprises the watercraft appliance and a plurality of fastening screws that are inserted into holes arranged in the appliance and held against rotation relative to it by means of respective retaining elements, for example in the form of washers. This assembly therefore allows the appliance to be attached with the intervention of one single operator, since there is no longer need for a further operator to prevent the rotation of the screws during attachment.

Although the known assembly described above makes the attachment of the watercraft appliance simpler and quicker, providing such an assembly requires in any case a certain number of operations that involve a substantial amount of time and labour.

Firstly, in many cases in watercraft appliances of the type indicated above the holes for fastening elements are not directly accessible when the appliance is in an assembled configuration. In fact, such holes are typically provided in the base of the appliance and are covered or in any case hidden by further components or cover elements when the appliance is assembled, so that in this configuration introducing the fastening elements into the holes is no longer possible. In these cases, in order to allow the positioning of the fastening elements it is therefore necessary to at least partially disassemble the appliance and reassemble it after having carried out the operation.

Secondly, once the fastening elements have been arranged in the respective seats, it is in any case necessary to apply additional retaining elements that prevent the fastening elements from rotating and sliding with respect to the appliance during the subsequent attachment of the assembly on the boat.

The technical problem underlying the present invention is to provide a fixing group for a watercraft appliance, said group making it possible to form in a simple manner and spending minimum amount of time and labour an assembly for carrying out a facilitated attachment, by means of threaded fastening elements, of the appliance onto a surface of a boat.

The present invention therefore relates, in a first aspect thereof, to a fixing group of a watercraft appliance for the attachment thereof on an outer side of a deck wall of a boat according to claim 1, in a second aspect, to an assembly comprising a watercraft appliance provided with such a fixing group according to claim 12, and, in a third aspect, to a method for attaching the watercraft appliance by means of the aforementioned fixing group according to claim 13. Preferred characteristics are indicated in the respective dependent claims.

In particular, in the first aspect thereof, the invention relates to a fixing group of a watercraft appliance for the attachment thereof to an outer side of a deck wall of a boat, said group comprising:
  a base of said watercraft appliance;
  at least one seat formed in said base and suitable for receiving a respective threaded fastening element so that said element has a free end projecting from the base for insertion into a respective through hole formed in the deck wall, so as to be accessible from an inner side of the deck wall for fixing the watercraft appliance to said deck wall, wherein said at least one seat comprises an access at a peripheral surface of said base and a retaining portion suitable for cooperating through shape coupling with said threaded fastening element to prevent the rotation and axial sliding thereof with respect to the base.

Advantageously, providing the access of the at least one seat at a peripheral surface of the base allows a respective threaded fastening element to be positioned into the seat without the need to remove components and/or cover elements that, in the assembled and operative configuration of the appliance, lay over such a seat. Further, the presence of a retaining portion integrated with the seat itself makes it possible to avoid the use of additional retaining means for preventing rotation and axial sliding of the threaded fastening element when positioned in the seat. The locking against rotation and axial sliding is achieved in the very act of positioning the threaded fastening element in the seat and is achieved in a simple manner through a shape coupling between the retaining portion of the seat and a portion, for example the head, of the threaded fastening element.

The operations required for obtaining an assembly comprising a watercraft appliance provided with the fixing group of the invention, for subsequently carrying out facilitated assembly of the watercraft appliance on a boat, are therefore advantageously reduced to just introducing the threaded fastening elements in respective seats of the fixing group, with an extremely small waste of time and labour.

It should also be observed that providing a fixing group having the aforementioned features in a watercraft appliance can be achieved without substantial layout modifications in the watercraft appliance itself.

In a preferred embodiment, the fixing group of the invention comprises a cover element removably associated with the base and suitable for cooperating into abutment with said peripheral surface.

Advantageously, the cover element, besides performing a protective and/or aesthetic function, avoids a threaded fastening element inserted into the at least one seat of the fixing group to inadvertently slip out from it when the watercraft appliance is stocked or it is handled for transportation or attachment.

Preferably, the cover element comprises at least one eyelet suitable for receiving through the free end of the threaded fastening element projecting from the base.

Preferably, the cover element comprises, at a surface thereof abutting with the peripheral surface of the base, at least one protrusion that can be inserted into the access of the at least one seat.

Both of these characteristics are useful for preventing translational displacements of the threaded fastening element in the respective seat, thus ensuring that it is held in the correct assembly position.

Preferably, the cover element is made of an elastomeric material.

Advantageously, thanks to the flexibility given by this type of material, the cover element can be easily slipped over or removed from the base.

Preferably, the at least one seat is defined by a recess of predetermined length formed in the peripheral surface of the base and provided with a groove with parallel flat faces defining the retaining portion.

Such a seat provides an easy access at the peripheral surface of the base and can be formed in a simple manner both upon manufacturing the base and in steps subsequent to the manufacture.

Preferably, the groove with parallel flat faces is defined at an upper side by a shoulder suitable for preventing the axial sliding of the threaded fastening element when housed in the at least one seat.

Advantageously, thanks to such a shoulder the threaded fastening element is prevented from slipping out from the at least one seat during handling or attachment of the watercraft appliance comprising the fixing group of the invention.

In a preferred embodiment, the recess has a longitudinal axis substantially perpendicular to the peripheral surface of said base.

In an alternative embodiment, said recess has a longitudinal axis oblique with respect to said peripheral surface of said base.

This alternative embodiment can be advantageous when there are structural constraints in the base, like for example holes, which do not allow the formation of recesses with longitudinal axis perpendicular to the peripheral surface of the base.

Preferably, at the shoulder delimiting the upper side of the groove with parallel flat faces defining the retaining portion a through hole is provided having a longitudinal axis substantially perpendicular to a lower contact surface of the base and transversal size smaller than the width of said groove with parallel flat faces.

Advantageously, such a through hole makes it possible to insert a threaded fastening element into the at least one seat to carry out a conventional attachment of the watercraft appliance, i.e. without providing an assembly for facilitated attachment in which the threaded fastening elements have been previously inserted into the seats of the fixing group and there locked against rotation and axial sliding. The fixing group of the invention therefore gives an advantageous flexibility in terms of attachment mode (conventional or facilitated). The transversal size of the through hole is in any case such as not to compromise the action of the shoulder against slipping out of the threaded retaining element in the case of an assembly provided for facilitated attachment.

Preferably, the watercraft appliance with which the fixing group of the invention is associated is a winch.

In the second aspect thereof, the invention relates to an assembly comprising a watercraft appliance provided with a fixing group having the characteristics outlined above and at least one threaded fastening element housed in a respective seat of said fixing group.

Such an assembly has advantages similar to those presented with reference to the fixing group of the invention as far as easy and fast arrangement is concerned.

In the third aspect thereof, the invention relates to a method for attaching a watercraft appliance to an outer side of a deck wall of a boat by means of one or more threaded fastening elements, comprising the steps of:

providing one or more seats for said threaded fastening elements in a base of said watercraft appliance, each of said seats comprising a respective access at a peripheral surface of the base and a retaining portion suitable for cooperating through shape coupling with the respective threaded fastening element to prevent rotation and axial sliding thereof with respect to the base;

laterally inserting the threaded fastening elements in said seats so that they have respective free ends projecting from the base, thus forming an assembly comprising said watercraft appliance and said threaded fastening elements;

positioning said assembly on an outer side of said deck wall so that said projecting free ends of the threaded fastening elements are inserted into respective through holes in the deck wall so as to be accessible from an inner side of said deck wall;

locking said threaded fastening elements at said inner side through screwing on said free ends of threaded fastening counter-elements.

Preferably, the method of the invention also comprises, after said insertion step and before said positioning step, the step of applying to the base a removable cover element, suitable for cooperating into abutment with said peripheral surface.

Preferably, the watercraft appliance is a winch.

Further characteristics and advantages of the present invention shall become clearer from the following detailed description of a preferred embodiment thereof, given hereafter, for indicating and not limiting purposes, with reference to the attached drawings. In these drawings.

Figure 1:
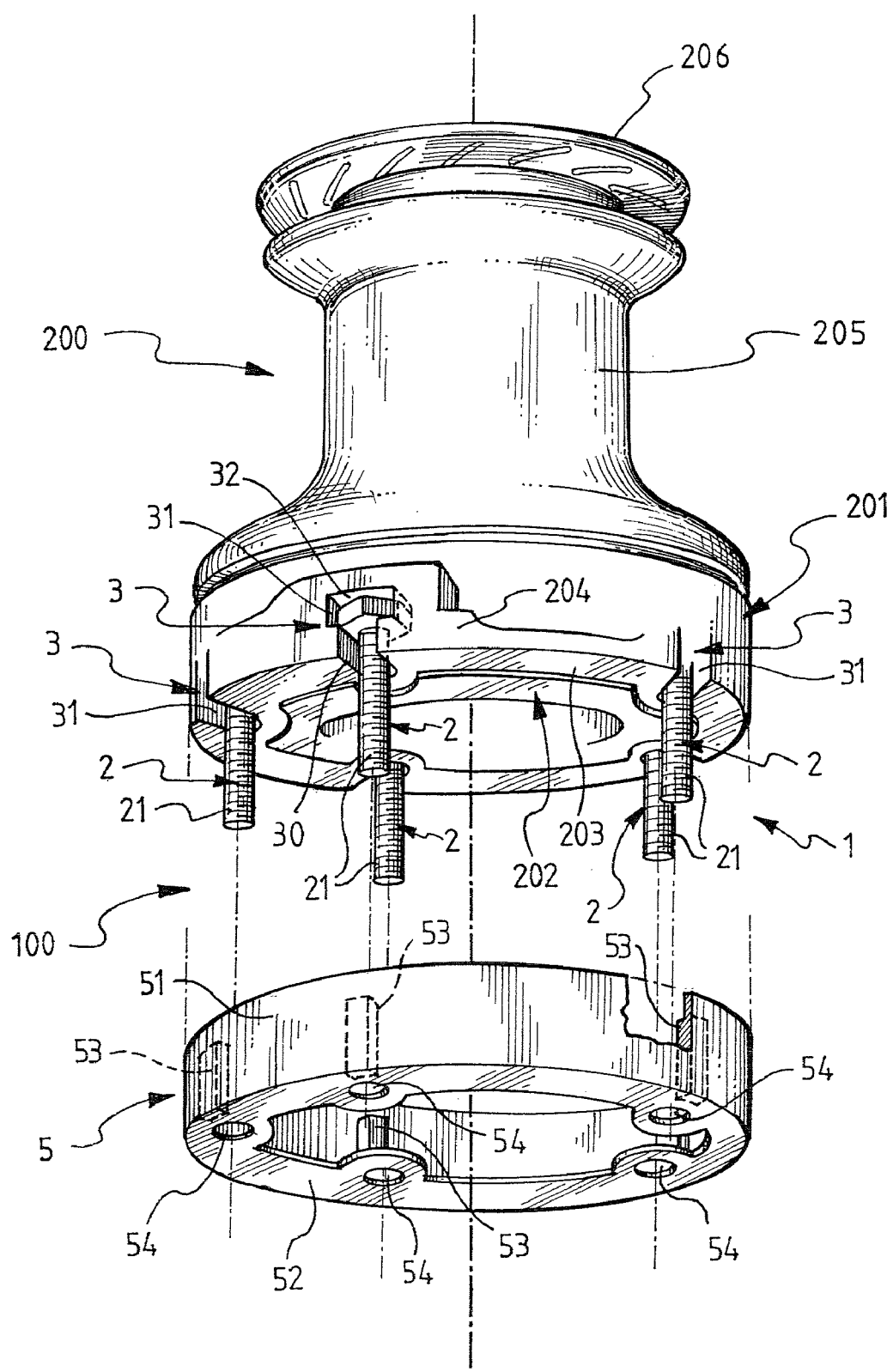
FIG. 1 is a schematic perspective view partially exploded and in section of an assembly comprising a watercraft appliance provided with a fixing group in accordance with the invention.
Figure 2:
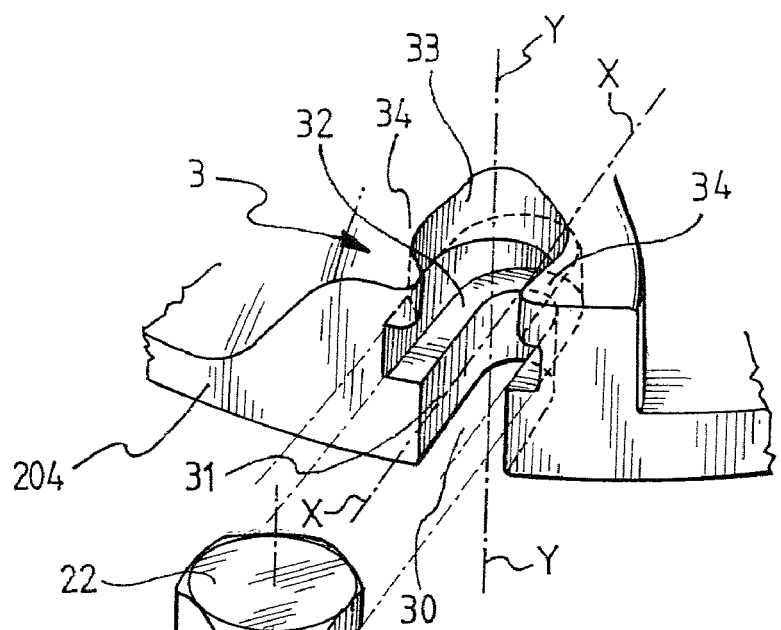
FIG. 2 is an enlarged schematic perspective view of a detail of the assembly of FIG. 1 that shows a first way of inserting a threaded fastening element into a seat of the fixing group.

In such figures an assembly according to the invention for facilitated attachment of a watercraft appliance 200, in particular a winch, to an outer side 302 of a deck wall 300 of a boat (not illustrated since not part of the invention) is generally indicated with reference numeral 100. The winch 200, totally conventional and not described here in detail, comprises a base 201, a central drum 205 and a top cap 206.

The assembly 100 comprises the winch 200, provided with a fixing group generally indicated with 1, and a plurality of threaded fastening elements 2, such as bolts or screws, in any case of the conventional type, associated with the fixing group 1.

In the examplary embodiment illustrated here the fixing group 1 essentially consists of the base 201 of the winch 200 and of a plurality of seats 3 formed therein for the threaded fastening elements 2. Each of the seats 3 is suitable for receiving a threaded fastening element 2 so that it has a respective free end 21 projecting from a lower contact surface 202 of the base 201.

Figure 6:
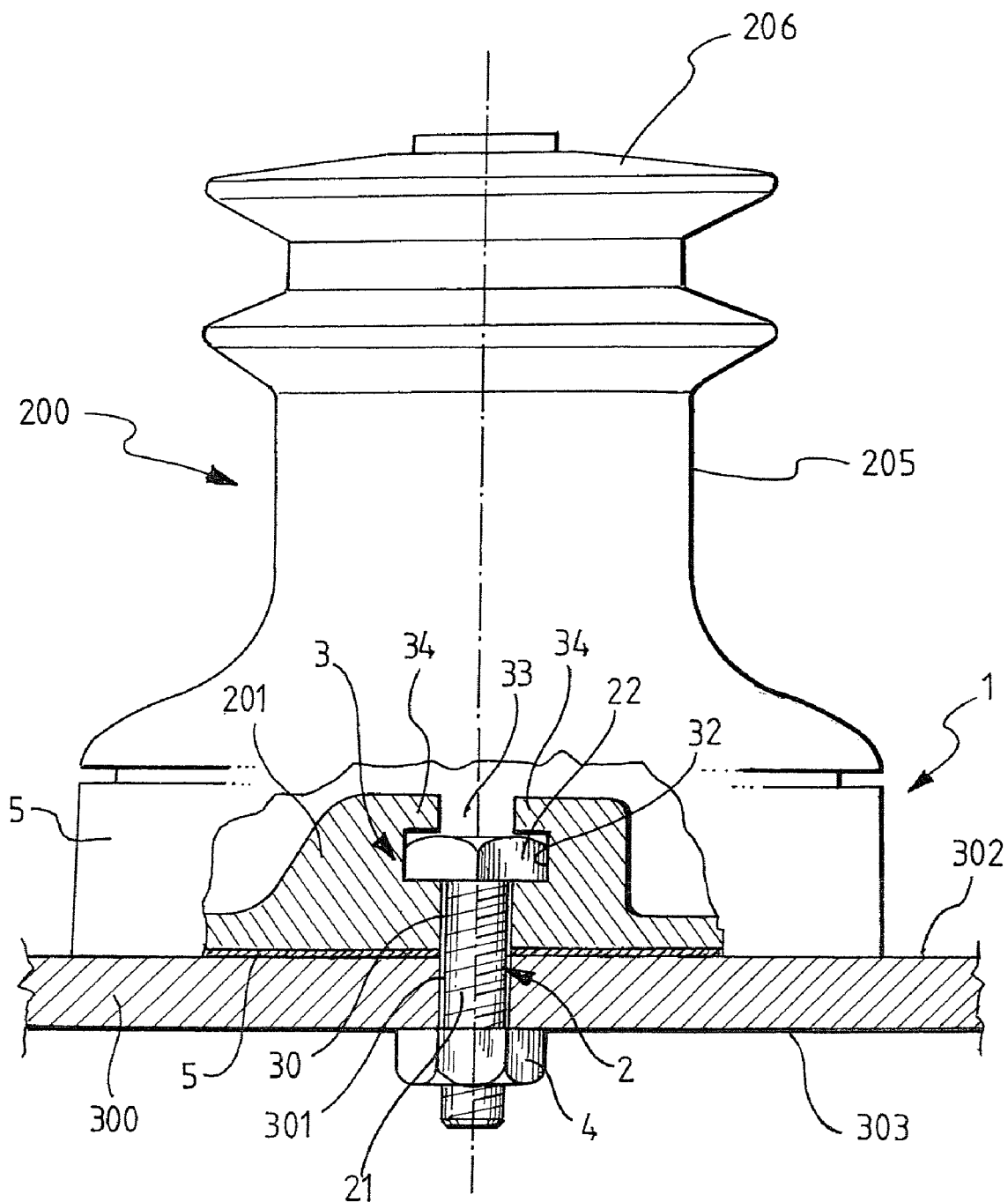
FIG. 6 is a schematic side view partially in section of the assembly of FIG. 1 attached to a deck wall of a boat.

As shown in FIG. 6, the free ends 21 are intended to be inserted into through holes 301 in the deck wall 300 so as to be accessible from an inner side 303 thereof. From such an inner side 303 conventional threaded fastening counter-elements 4 are applied to fix the winch 200 to the deck wall 300.

In accordance with the invention, each seat 3 comprises an access 31 at a peripheral surface 204 of the base 201 and a retaining portion 32 suitable for cooperating through shape coupling with the respective threaded fastening element 2 to prevent the rotation and the axial sliding thereof with respect to the base 201.

In the preferred embodiment illustrated in the figures each seat 3 is defined by a recess 30 of predetermined length formed in the peripheral surface 204. Each recess 30 is provided with a groove with parallel flat faces defining the retaining portion 32 of the respective seat 3. The groove with parallel flat faces is suitable for receiving and locking against rotation through shape coupling a polygonal, in particular hexagonal, head 22, of a respective threaded fastening element 2 (FIGS. 1, 2, 3 and 6).

The retaining portion 32 is delimited at the upper side by a shoulder 34 suitable for preventing the axial sliding, i.e. the vertical slipping out, of the threaded fastening element 2 with respect to the seat 3.

The seats 3 can be formed in the base 201 according to any way known to the man skilled in the art. In particular, in the embodiment shown in the figures they are integrally formed with the base 201, either upon manufacturing, for example by moulding or casting, or after the manufacturing through conventional mechanical processing, for example milling. In alternative embodiments (not illustrated), recesses 30 without retaining portions 32 and/or shoulders 34 can be integrally formed in the base 201, and thereafter shaped elements suitable for forming the retaining portions 32 and/or the shoulders 34 when they are associated with the base 201 at the previously formed recesses 30 can be applied to the base 201.

The recesses 30 defining the seats 3 have longitudinal axes X-X locally perpendicular to the peripheral surface 204, for example radial in the case illustrated here of a circular-shaped base 201.

In alternative embodiments (not illustrated) the longitudinal axes X-X can also be oblique with respect to the peripheral surface 204.

Figures 4, 5:
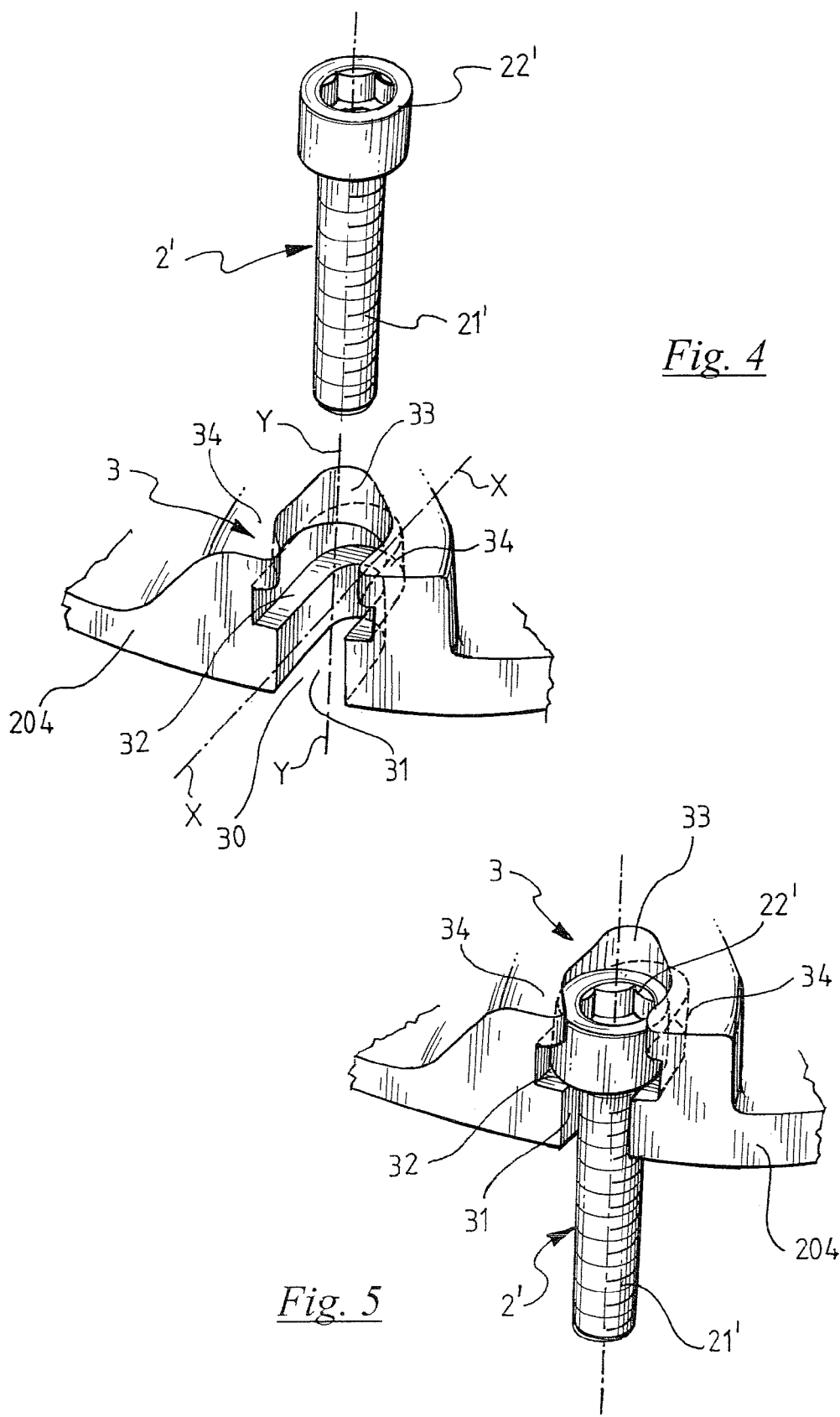
FIG. 4 is an enlarged schematic perspective view of a detail of the assembly of FIG. 1 that shows a second way of inserting a threaded fastening element into a seat of the fixing assembly.
FIG. 5 is a schematic perspective view of the detail of FIG. 4 with the threaded fastening element housed in the seat.

At each seat 3 a through hole 33 is provided having a longitudinal axis Y-Y substantially perpendicular to the lower contact surface 202 of the base 201. The through holes 33 communicate with the recesses 30 and allow the insertion from above of respective conventional threaded fastening elements 2', so that free ends 21' thereof project from the lower contact surface 202 of the base 201 (FIGS. 4, 5).

The transversal size of the through holes 33 is smaller than the width of the grooves with parallel flat faces defining the retaining portions 32 of the seats 3, so that, in the case of facilitated assembly, the action of the shoulders 34 against axial sliding of the threaded fastening elements 2 is not compromised. The through holes 33 are preferably sized and arranged with respect to the seats 3 so that the heads 22' of the threaded fastening elements 2' are completely received therein and come into lower abutment with surfaces of the retaining portions 32. As described more clearly hereafter, the threaded fastening elements 2' introduced into the holes 33 allow the winch 200 to be attached to the deck wall 300 in a conventional manner.

As shown in FIG. 1, the fixing group 1 further comprises a cover element 5 that can be removably associated with the base 201. The cover element 5 is preferably made of an elastomeric material and essentially consists of a skirt 51 suitable for cooperating into abutment with the peripheral surface 204 of the base 201. At a longitudinal end of the skirt 51 the cover element 5 is equipped with a perimetric flap 52 suitable for cooperating into abutment with a respective perimetric area 203 of the lower surface 202 of the base 201. Preferably, the perimetric area 203 is lowered, so as to be able to receive the flap 52 in such a way that it does not project beyond the edge of the lower surface 202 when the cover element 5 is mounted onto the base 201.

The skirt 51 is provided, at its inner side, with a plurality of protrusions 53 suitable for being inserted into the accesses 31 of the seats 3, so as to substantially prevent axial movements of the threaded fastening elements 2 (or 2') housed in such seats 3. The flap 52 is in turn provided with a plurality of eyelets 54 suitable for receiving through the free ends 21 (or 21') of the threaded fastening elements 2 (or 2') projecting from the lower surface 202 of the base 201.

With reference in particular to FIGS. 1, 2, 3 and 6 a preferred embodiment of a method for attaching the winch 200 on the deck wall 300 in accordance with the present invention shall now be described.

In a first step of the method seats 3 having the characteristics outlined above are provided in the base 201 of the winch 200.

Figure 3:
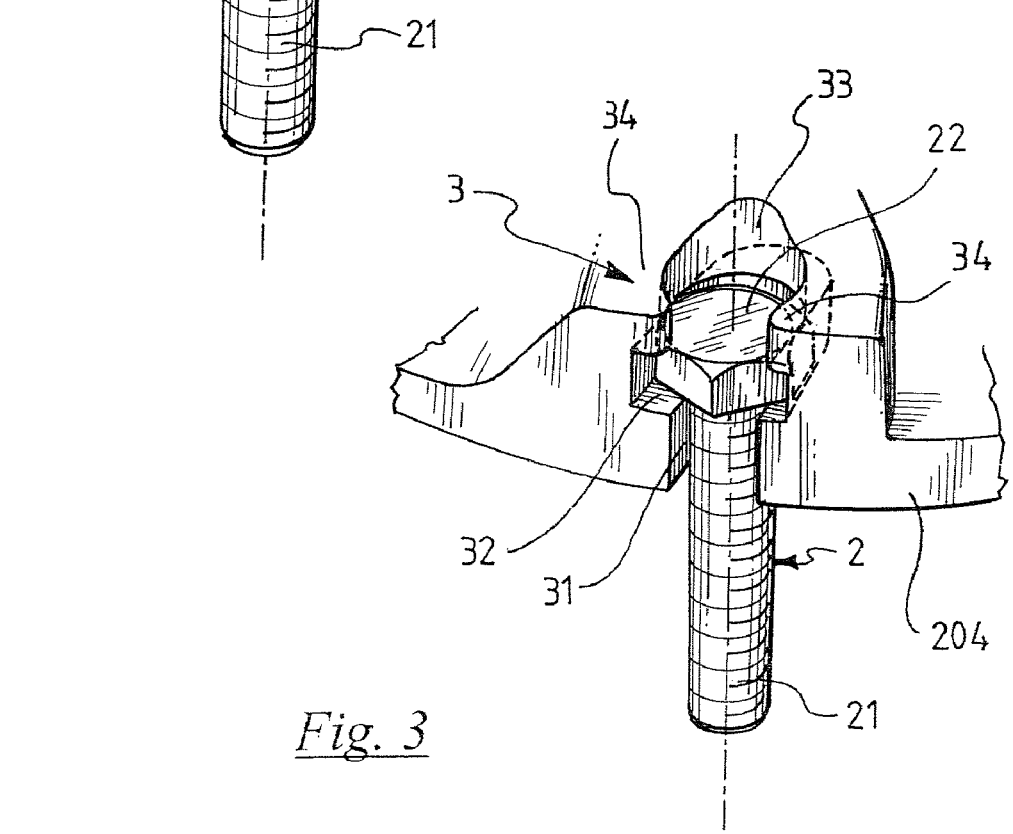
FIG. 3 is a schematic perspective view of the detail of FIG. 2 with the threaded fastening element housed in the seat.

In a second step of the method, respective threaded fastening elements 2 are laterally inserted into the seats 3 (FIG. 2) to form the assembly 100 for facilitated attachment of the winch 200. When the threaded fastening elements 2 are housed in the seats 3 (FIG. 3) the respective free ends 21 project from the lower contact surface 202 of the base 201 and rotation and axial sliding thereof with respect to the base 201 is prevented thanks to the shape coupling between the retaining portion 32 of each seat 31 and the heads 22 of the threaded fastening elements 2 (FIG. 3). The formation of the assembly 100 is completed by applying the cover element 5 to the base 201 (FIG. 1).

Should it be desired or required to commercialise the assembly 100, this step shall be carried out at the production site of the winch 200, for example in a final assembly step thereof. If, on the other hand, the winch 200 is commercialised independently and the end user still wishes to carry out facilitated attachment of the winch 200 to the deck wall of a boat, the aforementioned step can be carried out by such a user with the same ease and speed at the site where the attachment must take place.

In a subsequent step, the assembly 100 thus obtained is positioned on the outer side 302 of the deck wall 300 so that the projecting free ends 21 of the threaded fastening elements 2 are inserted into through holes 301 suitably arranged in the deck wall 300, so as to be accessible from the inner side 303 thereof.

In a subsequent step, the threaded fastening elements 2 are locked at the inner side 303 of the deck wall 300 through screwing on the free ends 21 of conventional threaded fastening counter-elements 4, for example nuts (FIG. 6). Since the threaded fastening elements 2 are held against rotation, this locking step can advantageously be carried out by one single operator.

Should the fixing group 1 of the winch 200 also be provided with through holes 33 at the seats 3, as described above, the winch 200 can, if desired, be mounted on the deck wall 300 even in a conventional manner without using an assembly for facilitated attachment, according to ways known to those skilled in the art. In this case, an initial step must be taken into account in which the winch 200 is partially disassembled, typically removing the top cap 206 and the drum 205, so as to make the through holes 33 accessible for the insertion of threaded fastening elements 2' (FIGS. 4 and 5), and a final step, after having carried out the attachment to the deck wall 300, in which the winch 200 is reassembled. Of course, since in this case the threaded fastening elements 2' are not locked against rotation with respect to the base 201, in order to fix the winch 200 to the deck wall 300 two operators are required, as described with reference to the prior art.

The invention claimed is:

1. Fixing group of a watercraft appliance for the attachment thereof to an outer side of a deck wall of a boat, said group comprising:
    a base of said watercraft appliance;
    at least one seat formed in said base and suitable for receiving a respective threaded fastening element so that said element has a free end projecting from the base for insertion into a respective through hole formed in the deck wall, so as to be accessible from an inner side of the deck wall for fixing the watercraft appliance to said deck wall,
wherein said at least one seat comprises an access at a peripheral surface of said base and a retaining portion suitable for cooperating through shape coupling with said threaded fastening element to prevent the rotation and axial sliding thereof with respect to the base.

2. Fixing group according to claim 1 comprising a cover element removably associated with said base and suitable for cooperating into abutment with said peripheral surface.

3. Fixing group according to claim 2, wherein said cover element comprises at least one eyelet suitable for receiving through said free end of the threaded fastening element projecting from said base.

4. Fixing group according to claim 2, wherein said cover element comprises, at a surface thereof abutting with said peripheral surface of said base, at least one protrusion that can be inserted into the access of said at least one seat.

5. Fixing group according to claim 2, wherein said cover element is made of an elastomeric material.

6. Fixing group according to claim 1, wherein said at least one seat is defined by a recess of predetermined length formed in the peripheral surface of said base and provided with a groove with parallel flat faces defining said retaining portion.

7. Fixing group according to claim 6, wherein said groove with parallel flat faces is defined at an upper side by a shoulder suitable for preventing the axial sliding of said threaded fastening element in said at least one seat.

8. Fixing group according to claim 6, wherein said recess has a longitudinal axis substantially perpendicular to said peripheral surface of said base.

9. Fixing group according to claim 6, wherein said recess has a longitudinal axis oblique with respect to said peripheral surface of said base.

10. Fixing group according to claim 7, wherein said base comprises a lower contact surface and at said shoulder a through hole is provided having a longitudinal axis substantially perpendicular to said lower contact surface and transversal size smaller than the width of said groove with parallel flat faces.

11. Fixing group according to claim 1, wherein said watercraft appliance is a winch.

12. Assembly comprising a watercraft appliance provided with a fixing group according to claim 1 and at least one threaded fastening element housed in a respective seat of said fixing group.

13. Method for attaching a watercraft appliance to an outer side of a deck wall of a boat by means of one or more threaded fastening elements, comprising the steps of:
    providing one or more seats for said threaded fastening elements in a base of said watercraft appliance, each of said seats comprising a respective access at a peripheral surface of said base and a retaining portion suitable for cooperating through shape coupling with the respective threaded fastening element to prevent the rotation and axial sliding thereof with respect to the base;
    laterally inserting said threaded fastening elements into said seats so that they have respective free ends projecting from said base, thus forming an assembly comprising said watercraft appliance and said threaded fastening elements;
    positioning said assembly on an outer side of said deck wall so that said projecting free ends of the threaded fastening elements are inserted into respective through holes in the deck wall so as to be accessible from an inner side of said deck wall;
    locking said threaded fastening elements at said inner side through screwing on said free ends of threaded fastening counter-elements.

14. Method according to claim 13, further comprising, after said insertion step and before said positioning step, the step of applying to said base a removable cover element suitable for cooperating into abutment with said peripheral surface.

15. Method according to claim 13, wherein said watercraft appliance is a winch.

* * * * *